United States Patent [19]

Hansen

[11] Patent Number: 4,757,907
[45] Date of Patent: Jul. 19, 1988

[54] PROCESS FOR PRODUCING A HEAT-SEALABLE CONTAINER AND PRODUCT THEREOF

[76] Inventor: Gerhard Hansen, Heerstrasse 20, 7166 Sulzbach-Laufen am Kocher, Fed. Rep. of Germany

[21] Appl. No.: 509,040

[22] Filed: Jun. 29, 1983

Related U.S. Application Data

[62] Division of Ser. No. 289,170, Aug. 3, 1981, Pat. No. 4,425,090.

[30] Foreign Application Priority Data

Sep. 9, 1980 [DE] Fed. Rep. of Germany ....... 3033821

[51] Int. Cl.[4] .................... B29C 17/07; B67B 1/00; B65D 39/00
[52] U.S. Cl. .................................. 215/31; 215/33; 264/525; 53/140; 53/452; 53/489
[58] Field of Search .......... 215/1 C, 32, 33, 31; 150/55; 425/524; 264/523–525; 53/140, 396, 452, 469, 467, 471, 473, 485, 486, 453, 489, 307

[56] References Cited

U.S. PATENT DOCUMENTS

Re. 27,155  7/1971  Hansen ................. 425/524
2,372,181  3/1945  Barr ....................... 215/33
3,251,915  5/1966  Pechthold ............ 264/524
3,409,710  11/1966  Klygis .............. 264/524 X
3,597,793  8/1971  Weiler et al. ...... 425/527 X
3,690,803  9/1972  Pechtold et al. ..... 53/453 X
3,851,029  11/1974  Cornett III et al. ...... 264/525
3,919,374  11/1975  Komendowski ...... 264/526 X
3,969,455  7/1976  Moller ................ 425/524 X
4,176,153  11/1979  Weiler et al. ....... 425/524 X
4,207,990  6/1980  Weiler et al. ........ 215/32 X
4,226,334  10/1980  Weiler et al. ........ 150/55 X
4,425,090  1/1984  Hansen ................ 264/511 X
4,707,966  11/1987  Weiler et al. ............ 53/410

*Primary Examiner*—William Price
*Assistant Examiner*—Sue A. Weaver
*Attorney, Agent, or Firm*—Roylance, Abrams, Berdo & Goodman

[57] ABSTRACT

In a process for making a filled and closed container of heat-sealable plastic hose, in one work operation, the hose is expanded to become a container body, the body is filled and the upper part of the container is shaped when the container is closed. After the filling process and before closing, the upper part of the container is closed by a rubber stopper.

8 Claims, 3 Drawing Sheets

PROCESS FOR PRODUCING A HEAT-SEALABLE CONTAINER AND PRODUCT THEREOF

This application is a division of application for producing a container from a hose or tube of heatsealable synthetic polymeric material such as polyethylene, the container being filled, provided with a stopper and heat-sealed closed in one work operation, and to a container made by the process and apparatus.

This invention relates to a process and apparatus Ser. No. 289,170 filed Aug. 3, 1981 now U.S. Pat. No. 4,425,090.

BACKGROUND OF THE INVENTION

A container having a predetermined, lasting shape can be produced using a known process and known apparatus as described in German AS No. 2,255,869 and employing a calibration pin in the area of the head of the container.

It is also known to produce, fill and close a container in one work operation, using a heat-sealable plastic hose, wherein a rubber stopper is inserted in the bottom of the container in such a way that the stopper is surrounded by the material of the container only on its outer circumference, leaving the outside face of the stopper exposed, as a consequence of which the stopper can get dirty. The stopper is not inserted or seated in the container tightly enough, with the result that bacteria from the outside can grow into the container.

It is also known to produce a filled and closed container the head of which contains an inserted rubber stopper which is closed off completely from the outside by the container. However, that container is made of two parts which are joined together after the manufacture, filling and closing of the major, bulging body portion of the container with the head which receives the rubber stopper being welded to the closed, bulging portion of the container. In this arrangement, even when a breakable seal is used, the closed bulging portion of the container must be pierced by the injection needle during use which can result in cutting out a part of the material of the bulging portion of the container and clogging of the injection needle.

BRIEF DESCRIPTION OF THE INVENTION

An object of the invention is to provide a method of forming a filled and closed container having a rubber stopper wherein the container is formed and closed in one work operation, and is of seamless construction.

Briefly described, the invention includes a process for the manufacture of a filled and closed container made from a heat-sealable hose of polymeric material such as polyethylene in a single operation of the type wherein the hose is expanded to become a container, the body portion of the container is filled and its upper head portion is shaped when the container is closed, comprising the steps of inserting a rubber stopper into the head portion after the container portion is filled and before the head portion thereof is closed so that the stopper closes off the lateral section of the container and a portion of the stopper extends into the head portion which is still to be shaped, shaping the head portion surrounding the rubber stopper so that at least part of the material of the head portion conforms to and encloses the outer circumference of the stopper, and sealing the outer portion of the head portion outside of the stopper.

In another aspect the invention comprises an improved apparatus for forming, filling and closing a container by expanding and shaping a heat sealable polymeric hose, the apparatus being of the type having a container-forming mold with split upper and lower parts, and a mold-holding fixture for each of the upper mold parts movable in opposite directions, the improvement comprising means movable at least vertically to within the hose for releaseably holding a rubber stopper; a cross slide for supporting said means for holding said stopper for horizontal movement relative to said mold, whereby said means for holding can be moved to a receiving position for engaging a stopper and to a position in said hose for placing the stopper therein The invention also includes a filled container made of thermoformable polymeric material comprising a body portion, a head portion and a stopper wherein said stopper is inserted into said body portion in closing relationship therewith after forming and filling said body portion, and said head portion is shaped around the circumference of said stopper and sealed to enclose said stopper, said container being of unitary seamless construction.

In order that the manner in which the foregoing and other objects are attained in accordance with the invention can be understood in detail, particularly advantageous embodiments thereof will be described with reference to the accompanying drawings, which form a part of this specification and wherein.

Figure 1:
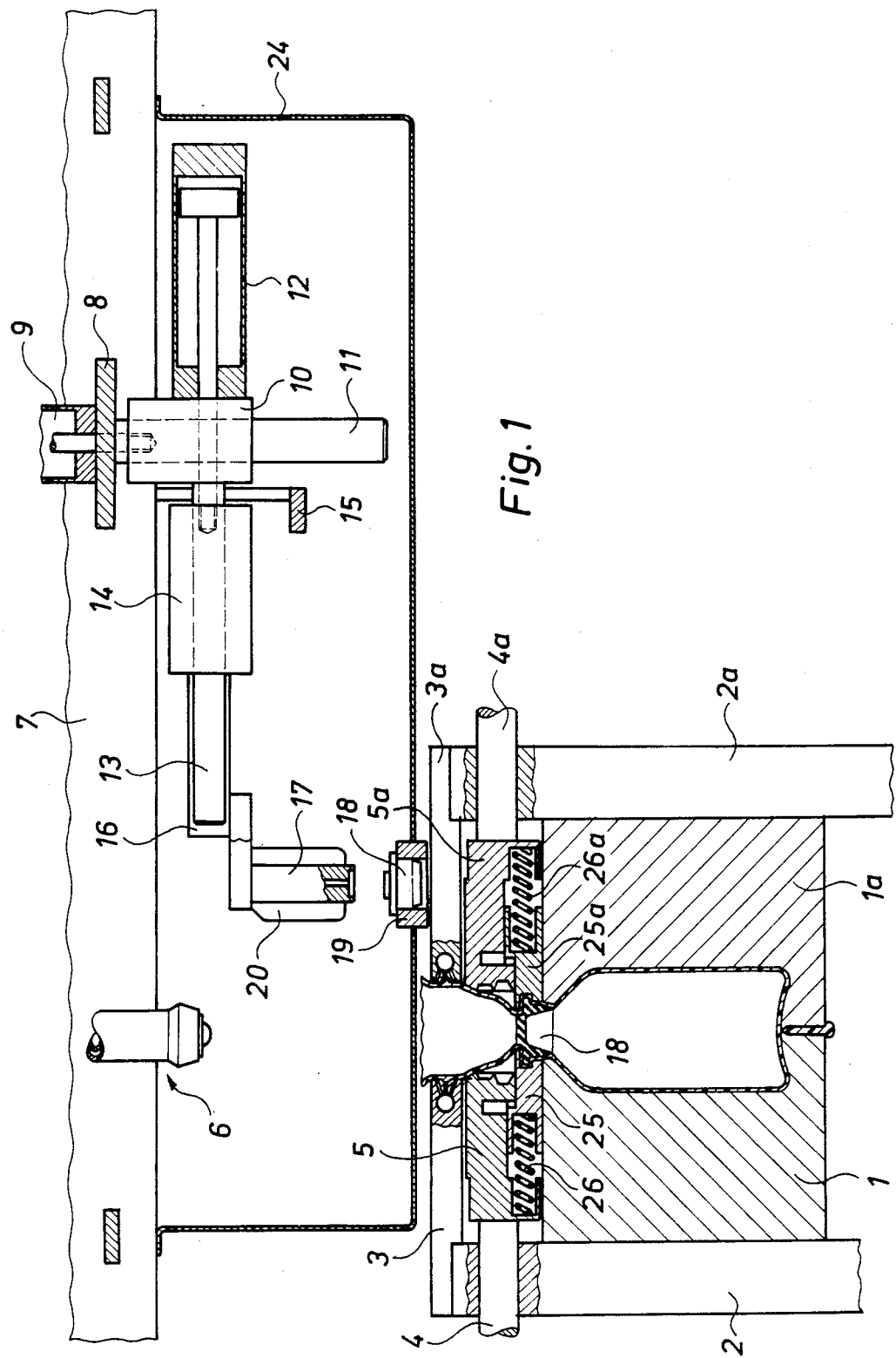
FIG. 1 is a partial side elevation, in partial section, of an apparatus in accordance with the invention along line I—I of FIG. 2.

As will be recognized by those skilled in the art, a portion of the apparatus employed in accordance with the present invention is known from, for example, the previously mentioned German AS No. 2,255,869, and includes two lower mold parts 1 and 1a which are horizontally movable and which can be opened and closed, the mold halves 1, 1a being supported respectively on plate-like supporting pieces 2 and 2a which can be moved toward and away from each other by arrangements such as piston and cylinder assemblies, not shown. A vacuum holding fixture having portions 3, 3a is fastened to the upper ends of both of the connecting pieces 2, 2a. Vacuum holding fixtures 3, 3a describe a circle and extend up to each other. Between lower mold part and vacuum holding fixture 3, is positioned a top mold part 5 which is attached to a piston rod 4 passing through connecting piece 2 and being connected to a piston and cylinder arrangement, not shown, which is positioned in such a way that mold portion 5 can be moved horizontally. Similarly, between lower mold part 1a and vacuum holding fixture 3a, there is a top mold part 5a which is also fastened to a piston rod 4a of a piston and cylinder assembly, not shown.

Figure 2:
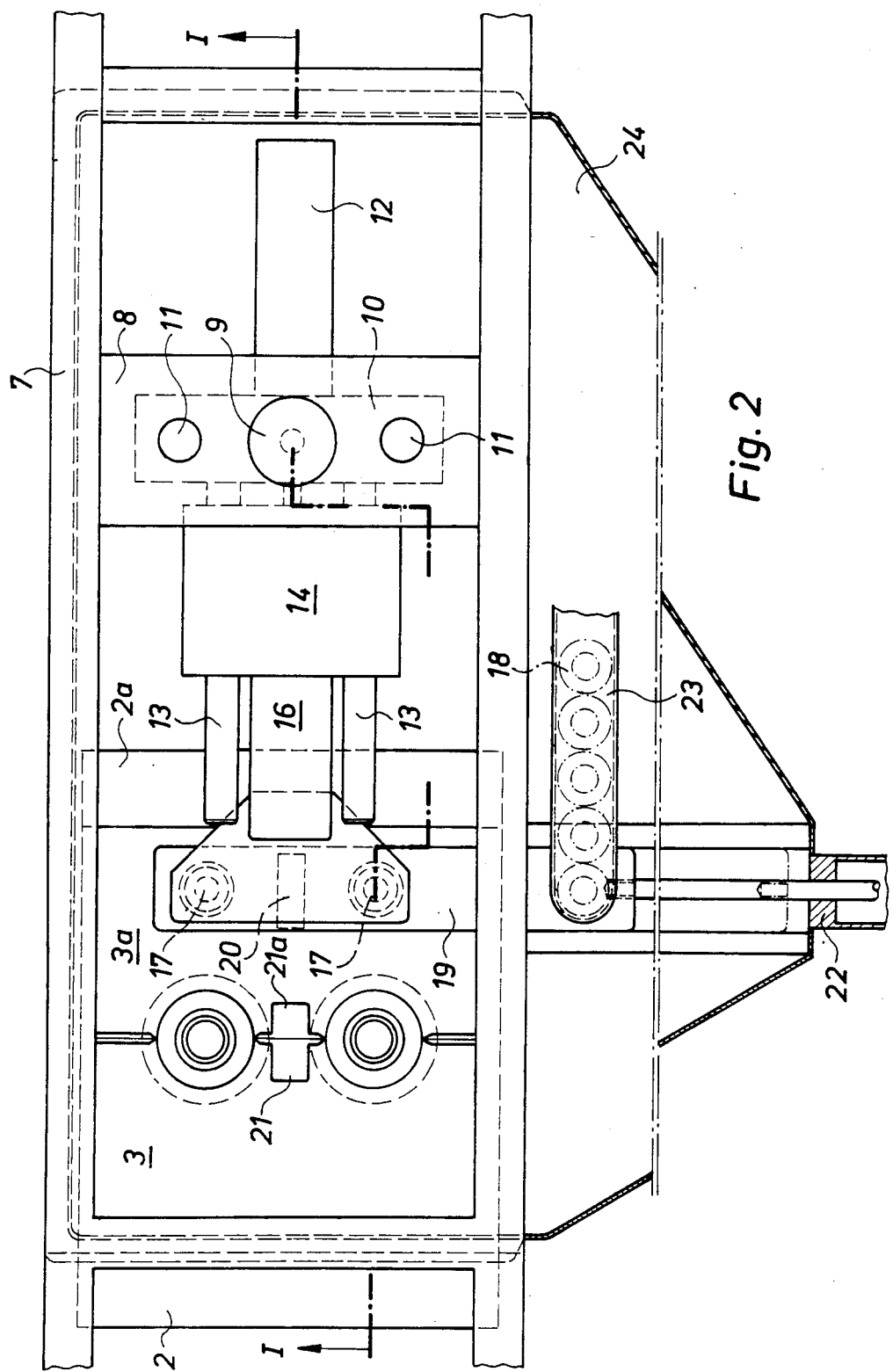
FIG. 2 is a partial top plan view of the apparatus of FIG. 1.
Figures 3, 4:
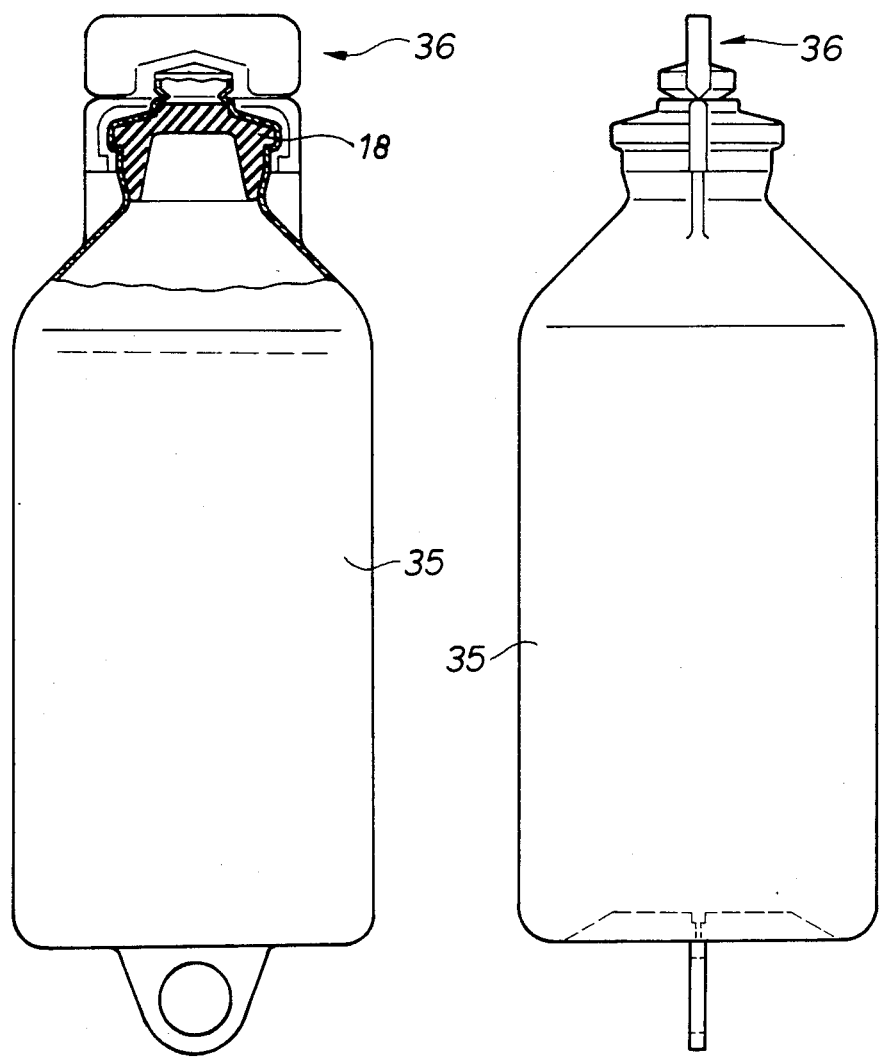
FIG. 3 is a front elevation, in partial section, of a container in accordance with the invention.
FIG. 4 is a side elevation of the container of FIG. 3.

As shown in FIG. 2, the production mold including components 1–5 and 1a–5a is used for simultaneously manufacturing two bottle-shaped containers of the type illustrated in FIGS. 3 and 4.

A blowing and filling mandrel 6 which can be raised and lowered is provided above the production mold and it can be located on a special support (not shown) or on a permanent bridge 7, in the form of a frame, to which an extruder (not shown) is also fastened Bride 7 supports a piston and cylinder assembly 9 having a vertical working axis which is supported on a transverse strut 8 with the piston rod of the piston and cylinder assembly being attached to a vertically slideable carriage 10. Guide bars 11 which are attached to opposite sides of strut 8, serve as guides for the movement of carriage 10.

A further piston and cylinder assembly 12 disposed to operate in a horizontal axis is attached to the vertically slideable carriage 10, the piston rod of assembly 12 passing through carriage 10 and being connected to a horizontally slideable carriage 14 which is guided by horizontally extending guide bars 13. A limiting element 15 is fastened to bridge 7 and serves to limit the extent of downward movement of carriage 10 and works together with horizontally slideable carriage 14 in one end position, as illustrated, but is inactive when carriage 14 is in its other end position.

A peg-shaped holding device 17, disposed along a vertical axis, is attached to the horizontally slideable carriage 14, on the end thereof opposite assembly 12, by means of a support 16, the holding device having a central conduit which can be selectively connected to a vacuum source, the conduit terminating in an inwardly extending recess shaped and dimensioned to receive a portion of a rubber stopper 18. The stopper, which is held by a collar, is disposed in a receiving position in a hole in a delivery slide 19. Because the production mold has two working cavities, a holding device 17 and a delivery slide 19 with a hole therethrough to receive a rubber stopper 18 is provided for each working cavity.

A rectangularly shaped limiting element is fastened to support 16 between the two holding devices 17 and, when the holding devices are moved to their operative positions in the molds, engages in recesses 21 and 21a of lower mold parts 1, 1a and limits the displacement movement of the top mold parts 5 and 5a toward each other.

Delivery slide 19 can be displaced horizontally in a direction perpendicular to the direction of movement of horizontally slideable carriage 14 by means of a horizontally disposed piston and cylinder assembly 22 (FIG. 2) and, as shown in FIG. 1 for stopper 18, it has a recess for each of the two rubber stoppers which it receives. The two recesses can be delivered one after the other under conveyor strip 23 which is supported, or forms part of, a vibration conveyor, not shown, from which two rubber stoppers 18 are delivered to delivery slide 19 with each work operation. The top of conveyor strip 23 is covered.

The lowered part of blowing and filling mandrel 6, vertically slideable carriage 10, horizontally slideable carriage 14, the two holding devices 17 and conveyor strip 23, as well as the individual components associated with them, are located in a chamber which is enclosed and sealed on all sides by sheet metal housing 24, the upper part of the chamber not being visible in the drawings. Sheet metal housing 24, as well as conveyor strip 23, can be charged with a sterilizing agent such as super heated steam, a disinfection liquid, sterilizing gas, or the like for initial and continuous sterilization so that sterile filling of the container with filling material (FIGS. 3 and 4) and the sterilization of the rubber stoppers 18 located in strip 23 is possible.

The filled and closed container 35 is shown in FIGS. 3 and 4 the top part of the container having a breakable closing device 36 and a rubber stopper 18 which is inserted in the top part, or head, of the container entirely enclosed by material of the container 35. The top part of the container fits against the outside of the rubber stopper up to a middle portion which is accessible after the breakable closing device 36 has been broken off, so that rubber stopper 18 can be pierced directly by an injection needle or the like.

To manufacture container 35, a parison is formed, the parison being a length of hose of polymeric material, such as polyethylene, which is extruded by an extruder, not shown, and grasped at its upper end by vacuum holding fixtures 3, 3a and lower mold parts 1, 1a, and the portion of the plastic hose located in and between the lower mold halves 1, 1a is inflated until it constitutes the bulging portion, or body, of a container. The body of the container is then filled with a filling material, the blowing and filling being accomplished through mandrel 6. After the body of the container is filled, rubber stopper 18 which is held by holding device 17 is inserted in the upper part of the body of the container. This is accomplished by the holding devices 17 each receiving a rubber stopper from delivery slide 19 by lowering carriage 10 until carriage 14 strikes the limiting element 15, whereupon holding devices 17 are again raised. The holding devices 17 are then moved horizontally into a coaxial position with the body of the container and with the remaining, unshaped, plastic hose which extends upwardly from the formed body, by displacing the horizontally slideable carriage 14. The holding devices are then lowered until the rubber stoppers carried thereby assume the position shown in FIG. 1 in which each stopper is in the upper part of the completed container body. The top mold parts 5, 5a are separated to their open positions as shown in FIG. 1 during this portion of the operation.

Inside each of the upper mold parts 5, 5a is a mold holding fixture 25, 25a which can be displaced parallel to the axis of piston rod 4 or 4a. A spring 26 is inserted between mold holding fixture 25 and top mold part 5, and it urges molding fixture 25 in the direction of fixture 25a located opposite it, a spring 26a accomplishing the same task on the other side of the top mold structure. The extent of movement through which fixtures 25, 25a are displaced in mold part 5 or 5a is terminated by a mechanical stop member.

After the rubber stopper 18 has been inserted in the previously formed body portion of the container and in the as yet unshaped portion of the plastic hose, the top mold parts 5, 5a are moved toward each other until they engage the limiting element 20 which is located, as previously described, between the two holding devices 17 which remain, at this stage, in the unformed portion of the hose. Element 20 simultaneously catches in recesses 21, 21a of lower mold parts 1, 1a. As a result, the running together of mold parts 5, 5a is limited. Mold holding fixtures 25, 25a however, can come sufficiently close to each other, that under the action of springs 26, 26a they engage the outer circumference of the heat-sealable plastic hose and a part of the top of the rubber stopper which has a projection in the middle of its upper face which remains free.

After the piston and cylinder assembly associated with rods 4, 4a have been relieved of their load, limiting element 20 can be removed from its position between upper mold parts 5, 5a by raising the holding devices 17. The upper mold parts then close, and the part of the head of container 35 having the breakable closing device is produced by application of an external vacuum. The containers manufacture in the two mold working cavities are ejected by opening the upper and lower mold part 1, 1a and 5, 5a and also the vacuum holding fixtures 3, 3a, allowing the formed, filled and sealed containers to drop out.

Although the embodiment described herein has two working cavities, it will be apparent that any number of cavities can be used.

It will also be recognized that the mold holding fixtures 25, 25a can be moved by means of piston and cylinder assemblies coupled thereto, in which case springs 26, 26a can be omitted.

As will be seen, the simple manufacturing process described herein calls for a less complicated apparatus, and consequently an apparatus which is less susceptible to trouble. The rubber stopper is introduced into the plastic hose in a work operation carried out between the filling and closing of the container and, when the container is finished, it is closed off completely from the outside by the container material so that no subsequent contamination of the rubber stopper can take place. When filling is carried out in a sterile manner, the sterility of the contents of the container continues to exist for a long time. If required, the container can be again sterilized subsequently. If the container has a breakable closing device providing free access to the rubber stopper, it is not necessary to pierce the head of the container with an injection needle.

While certain advantageous embodiments have been chosen to illustrate the invention it will be understood by those skilled in the art that various changes and modifications can be made therein without departing from the scope of the invention as defined in the appended claims.

What is claimed is:

1. A process for manufacturing a filled and closed container with a body portion and an upper head portion in a single operation from a single plastic tube, comprising the steps of:

locating an extruded plastic tube of polymeric materials between lower parts of a mold;

closing the lower parts of the mold to form the body portion of the container from a first part of the tube;

filling the body portion of the container with contents;

inserting a stopper into the head portion formed by a second part of the tube, after the body portion has been formed and filled with the contents, such that the stopper closes an upper end of the body portion and a portion of the stopper extends into the head portion and is supported by the lower parts of the mold;

shaping the head portion surrounding the stopper such that the head portion conforms to and encloses an outer circumference of the stopper; and sealing an outer portion of the head portion outside of the stopper.

2. A process according to claim 1 wherein the stopper is conveyed by a holding device from a supply source to a position coaxially above the body portion, and is then lowered until the stopper rests on a top part of the body portion.

3. A process according to claim 2 wherein the holding device is initially lowered to pick up the stopper from the supply source, and is then raised and moved over the body portion.

4. A process according to claim 1 wherein the head portion is shaped by relatively moveable upper mold parts with each upper mold part comprising first and second relatively moveable sections biased by a spring; the first sections slide to conform the head portion to the stopper; and the second sections subsequently slide to mold a container head.

5. A process according to claim 4 wherein the head portion is molded into the container head by applying a vacuum pressure.

6. A process according to claim 4 wherein sliding of the second sections is initially limited by a stop that is subsequently removed.

7. A filled and closed container made according to the process of claim 1.

8. A filled and closed container made according to the process of claim 4.

* * * * *